United States Patent [19]

Silver et al.

[11] Patent Number: 5,115,034
[45] Date of Patent: May 19, 1992

[54] CONDENSED PHASE POLYMERS

[75] Inventors: Spencer F. Silver, White Bear Lake; William R. Bronn, Maplewood; Eugene G. Joseph, Arden, all of Minn.

[73] Assignee: Minnesota Mining and Manufacturing Company, St. Paul, Minn.

[21] Appl. No.: 607,838

[22] Filed: Oct. 31, 1990

Related U.S. Application Data

[60] Continuation of Ser. No. 316,016, Feb. 27, 1989, abandoned, which is a division of Ser. No. 107,292, Oct. 9, 1987, Pat. No. 4,857,618.

[51] Int. Cl.$^5$ .................. C08F 230/08; C08F 230/10; C08F 297/04
[52] U.S. Cl. .................... 525/288; 525/105; 525/271; 525/274; 525/326.4; 525/326.6; 525/342; 525/359.5; 525/386; 526/240; 526/279; 526/173
[58] Field of Search ............ 525/105, 271, 288, 326.4, 525/326.5, 326.6, 342, 359.5, 386, 274

[56] References Cited

U.S. PATENT DOCUMENTS

| | | | |
|---|---|---|---|
| 2,982,757 | 5/1961 | Lewis | 260/46.5 |
| 3,223,686 | 12/1965 | Natta et al. | 526/240 |
| 3,480,584 | 11/1969 | Archer et al. | 526/279 |
| 3,629,214 | 12/1971 | Buning et al. | 526/279 |
| 3,949,020 | 4/1976 | Prudence | 260/879 |
| 4,010,226 | 3/1977 | Crossland et al. | 260/880 B |
| 4,080,400 | 3/1978 | Martin | 260/825 |
| 4,086,298 | 4/1978 | Fahrbach et al. | 260/880 B |
| 4,143,089 | 3/1979 | Martin | 260/827 |
| 4,148,838 | 4/1979 | Martin | 260/825 |
| 4,221,884 | 9/1980 | Bi et al. | 525/314 |
| 4,248,980 | 2/1981 | Bi et al. | 525/271 |
| 4,248,982 | 2/1981 | Bi et al. | 525/271 |
| 4,248,983 | 2/1981 | Bi et al. | 525/314 |
| 4,248,984 | 2/1981 | Bi et al. | 525/314 |
| 4,273,896 | 6/1981 | Martin | 525/271 |
| 4,391,949 | 5/1983 | St. Clair | 525/99 |

FOREIGN PATENT DOCUMENTS

| | | | |
|---|---|---|---|
| 0090365 | 10/1983 | European Pat. Off. | 525/342 |
| 0090365 | 10/1983 | European Pat. Off. | 525/342 |
| 0045338 | 3/1984 | Japan | 526/240 |
| 0053509 | 3/1984 | Japan | 526/279 |
| 7009902 | 1/1971 | Netherlands | 526/279 |

OTHER PUBLICATIONS

Hirao, Macromolecules, vol. 20, p. 242 ff, (1987).
Odian, *Principles of Polymerization*, 2nd Ed., Wiley-Interscience, p. 18 (1981).
Bi & Fetters (Macromolecules 9, 743-742 [1976]).
Nametkin, Chemical Abstract Nos.: 85:47314a (1976); 87:185046g (1977); 89:110569n (1978); and 93:168679x (1980).
Nametkin, Dokl. Nauk SSSR, 215, 861 (1974).
Chaumont (Eur. Poly. J. 15, 537 [1979]).
Kawakami, Polymer J., 14, 913 (1982).
Greber, Angew. Makromol. Chem., 1971, 16/17, 325.
Hirao et al., [Macromolecules 20, 242, (1987)].

*Primary Examiner*—Melvyn I. Marquis
*Assistant Examiner*—Vasu S. Jagannathan
*Attorney, Agent, or Firm*—Gary L. Griswold; Walter N. Kirn; Richard Francis

[57] ABSTRACT

The present invention relates to elastomeric copolymers and block copolymers, e.g., based upon styrene/isoprene, having a novel condensed phase structure wherein polymer branches occur along the polymer backbone, either at a predetermined location or at random locations. The polymers are made by a method which comprises the step of reacting, under polymerization conditions, hydrocarbyl lithium initiator, at least one anionically polymerizable compound, and an organometallic-substituted styrene condensing agent. The reactants may be added simultaneously to produce a copolymer with polymer branch segments randomly located along the polymer backbone or sequentially to produce a copolymer with branches located at the same predetermined location along the polymer backbone. The resultant polymers may be further reacted with a linking agent to form multi-arm copolymers.

7 Claims, 2 Drawing Sheets

CONDENSED PHASE POLYMERS

This is a continuation of application Ser. No. 07/316,016 filed Feb. 27, 1989, which is a divisional application of Ser. No. 07/107,292, filed Oct. 9, 1987, now U.S. Pat. No. 4,857,618.

TECHNICAL FIELD

This invention relates to anionically-prepared copolymers containing organometallic-substituted styrene.

BACKGROUND ART

According to Odian, *Principles of Polymerization*, 2nd Ed., Wiley-Interscience, p. 18, (1981) polymers fall into three. structural groups: linear, branched and crosslinked. Branched polymer molecules are those in which there are side branches of linked monomer protruding from various central branch points along the main polymer chain and that have several idealized configurations. Branched polymers are known in at least three configurations. They may be "comb-like" where each branch is of equal length, "dendritic" where branches occur on branches (series branching), or "star-like" where all branches radiate from a single point.

Branching often imparts various desirable properties, for example, branched polymers have been made that have improved melt flow and processability. Additionally, appropriate branching disrupts long linear polymer backbones to thereby reduce crystallinity. In free radical and cationic polymerization processes, for example in the production of polyethylene, branching is largely uncontrolled and its extent is dependent on polymerization variables. In some cases branching can be as high as 15-30 branches per 500 monomer units. In contrast, anionic polymerization processes yield very narrow molecular weight distributions and a unique structure. Branched polymer structures produced by anionic polymerization are generally star shaped (arrayed about a central point or nucleus) although the structure can be varied by coupling together individually prepared arms of different structure.

Such polymers are described by St. Clair in U.S. Pat. No. 4,391,949 where "asymmetric" star block copolymers are prepared by mutually linking together individually prepared living polymers, which may be represented by (AB)Li and (C)Li, with polyalkenylaromatic linking reagents. The structural formula describing the resulting polymer is given as $(A-B)_x-Y-(C)_z$, where x plus z is greater than six. A statistical distribution of polymer products would be obtained from this process, where the average structure is equal to the mole ratio of the respective charges. Further chain growth would only be possible through the linking nucleus Y.

Crossland, U.S. Pat. No. 4,010,226, has also recognized the problem of preparing block polymers with an asymmetric configuration and, to avoid the statistical distribution of polymers obtained by St. Clair, first coupled a set of polymer arms with divinylbenzene, then continued the polymerization, utilizing the anionic centers that remain on the divinylbenzene residue, to produce a different set of arms bound to the same nucleus. The number of new arms grown would thus equal the number of arms coupled together, since linking with divinylbenzene (DVB) is a non-terminating process and each newly grown arm would have an anionic terminus. Fahrbach, U.S. Pat. No. 4,086,298, discloses star-block copolymers having a mixture of arms where some arms are formed by first polymerizing styrene with alkyllithium to form living polymer blocks, represented by (A)Li, and then adding a mixture of styrene and butadiene to form a graded copolymer represented by A-B→A' where the arrow represents a graded segment. Other arms are made up of only the butadiene-styrene graded copolymer segment. These arms are then linked together with a polyfunctional coupling agent, such as DVB, to give star-branched polymers. U.S. Pat. Nos. 4,221,884, 4,248,980, 4,248,982, 4,248,983, and 4,248,984, Bi and Milkovich, describe a similar series of polymers in which more complex polymer arm segments are linked together using a polyalkenyl aromatic, such as divinylbenzene, to form an asymmetric star molecule.

Prudence (U.S. Pat. No. 3,949,020) prepares branched block polymers by a method wherein divinylbenzene is added with the diolefin monomer to a polystyryllithium initiator. However, according to Bi and Fetters (Macromolecules 9, 732-742 [1976]), such a method leads to gelation when the divinylbenzene/initiator ratio is three or greater.

Martin, in U.S. Pat. Nos. 4,080,400, 4,143,089, 4,148,838, and 4,273,896, describes a composition obtained from the linking together of anionically active polymers (from, e.g., styrene) with silanes of the formula, $X_{4-a-b}Si(R)_b(CH=CH_2)_1$, where X is a displaceable group, R is alkyl, a is 1 to 4 and b is 1 to 3. One of the stated objects of these patents is to couple polymeric carbanions with silanes and then form new carbanions which can be used to initiate the polymerization of cyclic silicones or "other unsaturated monomers". No disclosure is provided directed towards the step of using other unsaturated monomers except for certain unspecified hydrocarbon/siloxane block polymers.

It has been established [Nametkin, Chemical Abstract Nos. 85:47314a (1976), 87:185046g (1977), and 89:110569n (1978)] that vinylsilanes of the type described by Martin will copolymerize in an anionic fashion, for example with butadiene; however, reactivity is very low, with up to 300 hours required for good conversion. Furthermore, copolymers of vinyl silanes with dienes initiated by butyl lithium are unimodal but exhibit peak broadening due to the occurrence of chain termination reactions caused by spontaneous cleavage reactions producing lithium hydride (Nametkin, Chemical Abstract No. 93:168679x, 1980). Loss of LiH during anionic homopolymerization of vinyltrimethylsilane has also been observed and has been used to explain the poor conversion and spread in molecular weight distribution observed in these polymers [Nametkin, Dokl. Nauk SSSR, 215, 861 (1974)]. Chaumont [Eur. Poly. J. 15, 537 (1979)] prepared vinylsilyl terminated polystyrenes via anionic polymerization; however, it was necessary to cap the polymer anion with diphenylethylene in order to reduce side reactions.

Chlorosilane-substituted styrenes are well-known compounds and have been used, for example, to prepare polysiloxane macromolecular monomers [Kawakami, Polymer J., 14, 913 (1982)]. Chromatography gels have been described based on poly-α-methylstyrene dianions and chlorodimethylsilylstyrene [Greber, Angew. Makromol. Chem. 1971, 16/17, 325]. Compositions for the encapsulation of electrical equipment have been derived from organosilicon monomers having styrenyl groups (Lewis, U.S. Pat. No. 2,982,757). Hirao et al. (Macromolecules 1987, 20, 242) has studied the anionic homopolymerization of (4-alkoxysilyl) styrenes and reaction of the resultant homopolymer with polystyryllithium.

There has been no disclosure, however, of the use of organometallic-substituted styrenes, e.g., chlorosilane-substituted styrenes, in the preparation of condensed phase polymers.

SUMMARY OF THE INVENTION

The present invention provides elastomeric copolymers and block copolymers, e.g., based upon styrene/isoprene, having a novel condensed phase structure wherein polymer branches occur along the polymer backbone, either at a predetermined location or at random locations. The polymers of the present invention are made by a method which comprises the step of reacting, under polymerization conditions, hydrocarbyl lithium initiator, at least one anionically polymerizable compound, and an organometallic-substituted styrene condensing agent. The reactants may be added simultaneously to produce a copolymer with polymer branch segments randomly located along the polymer backbone or sequentially to produce a copolymer with branches located at the same predetermined location along the polymer backbone. The resultant polymers may be further reacted with a linking agent to form multi-arm copolymers. The method of making the copolymers is claimed in U.S. application Ser. No. 107,262, filed Oct. 9, 1987, now U.S. Pat. No. 4,857,168.

The resultant elastomeric polymers are compatible with any of a wide variety of known tackifier resins and plasticizers to produce unique pressure-sensitive adhesive compositions. The pressure-sensitive adhesive compositions are claimed in U.S. application Ser. No. 107,289, filed Oct. 8, 1987, now U.S. Pat. No. 4,906,691.

Specifically, the method comprises the step of reacting, under polymerization conditions, the following:

(a) hydrocarbyl lithium initiator;
(b) at least one anionically polymerizable compound; and
(c) a condensing agent having the general formula $$CH_2=C(R')QY(R)_n(X)_m \qquad I$$

wherein

Y is tetravalent Si, Ge, Sn or Pb;
X is H, —OR", Cl, Br or F wherein R" is a monovalent lower alkyl group having from 1 to 6 carbon atoms;
R is hydrogen, a monovalent lower alkyl group having from 1 to 6 carbon atoms, or phenyl;
Q is phenylene;
R' is hydrogen, a monovalent lower alkyl group having from 1 to 6 carbon atoms, or phenyl;
m is an integer of 1, 2, or 3; and
n is an integer equal to 3−m, in a mole ratio of (a) to (c) of about (1+m):1 to form a condensed phase copolymer.

The elastomeric polymers are anionic copolymers comprising at least one anionically polymerizable monomer and a condensing agent (I) monomer wherein the mole percentage of condensing agent (I) in each copolymer segment containing the condensing agent (I) is in the range of about 0.01% to about 5%.

The polymers of this invention are generally copolymers of the condensing agent (I) with conjugated diene monomer, or are block copolymers of conjugated diene and vinyl aromatic monomers (wherein at least one block is a copolymer of condensing agent monomer and either diene or vinyl aromatic monomer). The monovinyl aromatic monomer yields a hard polymer segment having a high $T_g$, i.e., above 25° C. The conjugated diene monomer yields a soft (generally elastomeric) polymer segment having a low $T_g$, i.e., not greater than about 0° C.

The polymers of the invention are preferably elastomeric anionic polymers comprised of conjugated diene monomer, typically containing 4 to 12 carbon atoms, monoalkenyl or monovinyl aromatic monomer and the condensing reagent (I) wherein the mole percent of condensing reagent in a polymer segment containing such reagent is about 0.01 to about 5.0, preferably about 0.02 to about 2.0. Typically, the copolymer contains on a weight basis from about 50% to about 90% conjugated diene and about 50% to about 10% monoalkenyl or vinyl aromatic monomer.

In one embodiment, branch points are introduced at predetermined loci in the polymer chain by addition of condensing agent in a sequential fashion, i.e., after formation of a living polymer segment via conventional anionic polymerization techniques. Thus, copolymer is prepared by first forming a living linear polymer segment, then reacting the living polymer segment with the condensing reagent to form a condensed living copolymer and next polymerizing therewith additional polymerizable compound to form a condensed phase block copolymer. Such a block copolymer may be represented by the following general formula:

$$(A)_xZ_q-B \qquad II$$

where:

A is a nonelastomeric polymer segment based on a monovinyl aromatic compound such as styrene, alpha-methylstyrene, para-methylstyrene, and t-butyl styrene;
B is an elastomeric polymer segment based on a conjugated diene compound, such as butadiene, isoprene, and piperylene;
Z is the residue of a condensing reagent having the general formula $$CH_2=C(R')QY(R)_n(X)_m \qquad I$$

where X, R, Y, Q, R,, m and n have been defined above;
q is an integer from 1 to about 10;
x is an integer from 2 to about 10; and
wherein the mole percentage of Z in the segment $(A)_xZ_q$ is in the range of about 0.1% to about 5%.

The method comprises the further step of contacting the resulting condensed phase block copolymer of Formula II with a multifunctional linking agent such as a polyalkenyl aromatic linking agent under reactive conditions thereby forming a multi-arm condensed phase block copolymer. Such a block copolymer may be represented by the following general formula:

$$[(A)_xZ_q-B]_yL_z \qquad III$$

where:

A, Z, B, x, and q have been defined above;
L is the residue of a multifunctional linking agent;
z is an integer from zero to about 10;
y is an integer from 1 to about 50 and, when y is 1, z is zero;

wherein the mole percentage of Z in the segment $(A)_xZ_q$ is in the range of about 0.1% to about 5%.

The method also comprises first forming a living linear polymer segment, adding a second polymerizable compound to form a living linear block copolymer segment, then reacting the living linear block copolymer segment with the condensing reagent to form a condensed living block copolymer, and next polymerizing therewith additional polymerizable compound to form a condensed phase block copolymer represented by the following general formula:

$$(A-B)_x Z_q - B \qquad \text{IV}$$

where:

A, B, Z, x and q are defined above and wherein the mole percentage of Z in the segment $(A-B)_x Z_q$ is in the range of from about 0.01% to about 1%.

The method comprises the further step of contacting resulting block copolymer IV with a multifunctional linking agent under reactive conditions thereby forming a multi-arm condensed phase block copolymer represented by the general formula shown below:

$$[(A-B)_x Z_q - B]_y L_z \qquad \text{V}$$

wherein:

A, B, Z, L, x, q, y and z are defined above and wherein the mole percentage of Z in the segment $(A-B)_x Z_q$ is in the range of about 0.01% to about 1%.

Other condensed phase block copolymers besides II and IV are also contemplated and may be linked to form multi-arm condensed phase block copolymers other than III and V. Such block copolymers, including II, III, IV, and V, may be represented by the general formula:

$$[(W)_x Z_q - W']_y L_z \qquad \text{VI}$$

wherein:

W is selected from the group consisting of A, B, BA, and AB, W' is selected from the group consisting of B, BA and AB, and A, B, Z, L, x, q, y and z are defined above, and wherein the mole percentage of Z in the segment $(W)_x Z_q$ is in the range of from about 0.01% to about 5%.

In a second embodiment, randomly placed branch centers are generated on the polymer chain by polymerization of a mixture of condensing agent and anionically polymerizable monomer or monomers. The method involves simultaneously reacting a hydrocarbyl lithium initiator, polymerizable compound, and condensing reagent to form a living condensed phase copolymer having a randomly-branched structure which may be represented by the following general formula:

$$B/Z \qquad \text{VII}$$

wherein B and Z are defined above, and wherein the mole percentage of Z in the copolymer is from about 0.01% to about 1%.

Copolymer VII may be further reacted with a multi-functional linking agent, thereby forming a multi-arm condensed phase copolymer. Such a copolymer may be represented by the general formula:

$$(B/Z)_y L_z \qquad \text{VIII}$$

wherein B, Z, L, y and z are defined above, and wherein the mole percentage of Z in the unlinked copolymer is from about 0.01% to about 1%.

Monovinyl aromatic monomer may be polymerized with condensing reagent to form a randomly-branched living copolymer which may be further treated by adding a different polymerizable compound such as butadiene, isoprene, or piperylene, after completion of the simultaneous reaction and permitting the different polymerizable compound to copolymerize with the living copolymer to form a condensed phase block copolymer. The resultant copolymer may be further reacted with a multi-functional linking agent thereby forming a multi-arm condensed phase block copolymer. Such block copolymer may be represented by the general formula:

$$[(A/Z)-B]_y L_z \qquad \text{IX}$$

wherein A, B, Z, L, y and z are defined above, and wherein the mole percentage of Z in the segment A/Z is in the range of from about 0.1% to about 5%.

In addition, a randomly-branched living copolymer derived from monovinyl aromatic monomer may be further treated by adding a mixture of a different polymerizable compound and additional condensing reagent, after completion of the simultaneous reaction, and permitting the mixture to copolymerize with the living copolymer to form a block copolymer having "condensed" structure randomly placed in both blocks. This block copolymer may be further reacted with a multi-functional linking agent under reactive conditions thereby forming a multi-arm condensed phase block copolymer. Such a block copolymer may be represented by the general formula:

$$[(A/Z)-(B/Z)]_y L_z \qquad \text{X}$$

wherein A, B, Z, L, y and z are defined above, and wherein the mole percentage of Z in the segment A/Z is in the range of from about 0.1% to about 5% and in the segment B/Z is from about 0.01% to about 1%.

Alternatively, a different condensed phase block copolymer may be prepared by first forming a living linear polymer segment, adding a mixture of a second polymerizable compound and the condensing reagent, and then permitting the mixture to copolymerize with the living linear polymer segment produced by polymerization of the first polymerizable compound. The resulting block copolymer may be further modified by contacting it with a multifunctional linking agent under reactive conditions thereby forming a multi-arm condensed phase block copolymer. Such a block copolymer may be represented by the general formula:

$$[A-(B/Z)]_y L_z \qquad \text{XI}$$

wherein A, B, Z, L, y and z are defined above, and wherein the mole percentage of Z in the segment B/Z is in the range of from about 0.01% to about 1%. The unlinked block copolymer may be alternatively modified to include an additional linear polymer segment to provide a block copolymer which may be represented by the general formula:

$$A-(B/Z)-A \qquad \text{XII}$$

wherein A, B and Z are defined above.

BRIEF DESCRIPTION OF DRAWINGS

Understanding of the invention will be facilitated by reference to the drawings, wherein.

DETAILED DESCRIPTION

Figure 1:
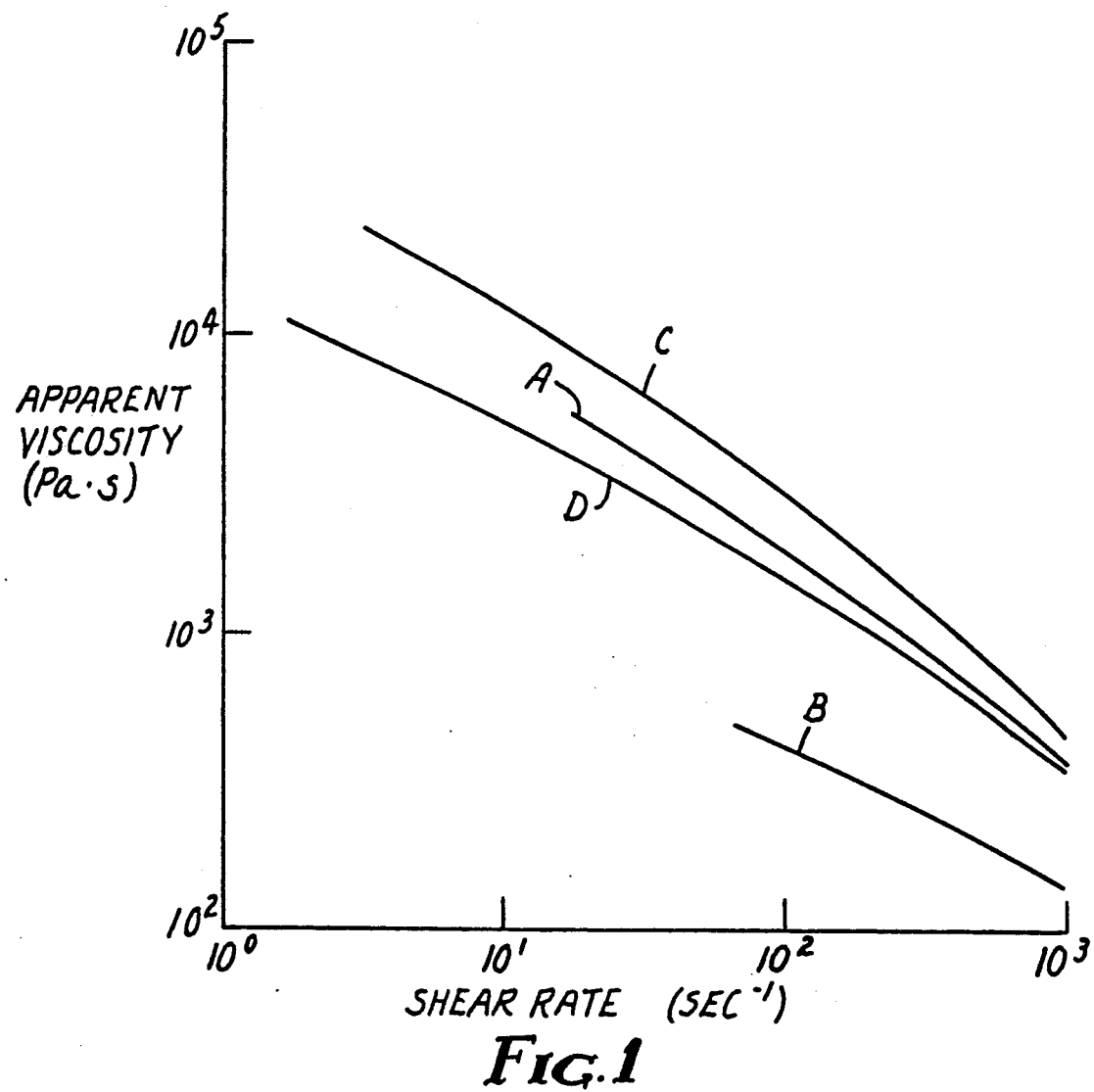
FIGS. 1 and 2 are graphs depicting the melt viscosity of untackified and tackified polymers according to the invention and a styrene isoprene linear triblock copolymer (Shell's Kraton ® 1107) according to the prior art as a function of shear rate.

The initiators useful in the preparation of the copolymers of this invention are known alkyllithium compounds such as methyllithium, n-butyllithium and sec-butyllithium, cycloalkyllithium compounds such as cyclohexyllithium, and aryllithium compounds such as phenyllithium, naphthyllithium and the like.

Useful monoalkenyl aromatic monomers include styrene, ring-substituted styrenes, and alpha-substituted styrenes. These can be used individually or as mixtures. Preferred are styrene, alpha-methylstyrene, paramethylstyrene, and t-butylstyrene. Useful conjugated diene monomers have 4 to 12 carbon atoms, e.g., 1,3-butadiene, isoprene, piperylene, myrcene, 2,3-dimethylbutadiene, and the like. These also may be used individually or as mixtures. Preferred conjugated diene monomers are 1,3-butadiene, isoprene, and piperylene.

The "condensed phase" or branch structure of the copolymers of this invention is formed by addition of a multifunctional "condensing" reagent to create points at which two or more polymer segments are connected together by the reagent. The terminology "condensed" is derived from the term "polycondensation" which, according to *Chemical Kinetics* edited by C. H. Bamford (Elsevier, 1976), is used to denote those polymerization reactions which proceed by a propagation mechanism in which an active polymerization site disappears every time one monomer equivalent reacts. Also, *Webster's 7th Collegiate Dictionary* defines condensation as a chemical reaction involving union between atoms in the same or different molecules often with elimination of a simple molecule to form a more complex compound of often greater molecular weight. It should be pointed out that the linking processes that occur with "condensing" reagents and linking agents such as divinylbenzene are very different. "Condensing" reagents yield a polymeric species with a single anionic charge, whereas divinylbenzene joins polymer segments together to give a nucleus containing a number of anions equal to the number of chains linked together. Thus, the potential for network formation and gelation associated with the method of Prudence is avoided by use of "condensing", rather than linking, agents.

Suitable condensing agents are compounds having dual functionality, the first derived from at least one anionically polymerizable group and the second from at least one other group capable of undergoing one or more nucleophilic displacement reactions. One active chain is terminated by each nucleophilic displacement reaction. The relative reactivity of the two groups is unspecified, such that anion addition may be faster or slower than termination, and the preference of relative reactivity for the two groups will depend on the final polymer structure desired. The condensing agent must be compatible with anionic polymerization processes; i.e., its anionically polymerizable group(s) should be capable of reinitiating polymerization of itself or other anionically polymerizable monomers. Useful condensing agents are molecules of the following structure:

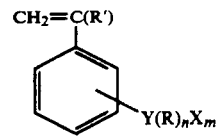

wherein
Y is tetravalent Si, Ge, Sn, or Pb;
X is H, —OR″, Cl, Br, or F, wherein R″ is a monovalent lower alkyl group having from 1 to 6 carbon atoms;
R is hydrogen, a monovalent lower alkyl group having from 1 to 6 carbon atoms, or phenyl;
R′ is hydrogen, a monovalent lower alkyl group having from 1 to 6 carbon atoms, or phenyl;
m is an integer of 1, 2, or 3; and
n is an integer equal to $3-m$.

The displaced group, X, does not subsequently react in a side reaction with polymer anions. The alkenylaromatic group may be substituted in the alpha position with alkyl or aromatic moieties, R′, to modify condenser reactivity. The alkenylaromatic group may also be further substituted on the aromatic ring with groups such as alkyl, phenyl, alkoxy, dialkylamino, and the like, which are not reactive toward polymer anions. Preferred condensing agents are the silylstyrenes for which R is methyl, R′ is hydrogen, Y is silicon, and X is F, Cl, Br, or methoxy, or, most preferably, X is F or Cl.

The above-described condensing agents are readily prepared via an in situ Grignard reaction involving, e.g., para-chlorostyrene and chloroalkylsilane. Other routes for the preparation of these compounds have been described by Chernyshev (Chemical Abstracts 62:6502c). The condensing agents are utilized to achieve a branched or condensed phase polymer structure by addition of 1/n mole of multifunctional condenser per mole of active polymer anions, where n is the total number of anionically reactive sites on the condenser molecule. The mole percentage of condensing agent monomer in any particular polymer segment is generally within the range of from about 0.01% to about 5%, preferably, within about 0.02% to about 2%. (For monovinyl aromatics, the range is about 0.1–5%, with about 0.2–2% preferred; for conjugated dienes, the range is about 0.01–1%, with about 0.02–0.2% preferred.)

Conventional anionic polymerization techniques are utilized in preparing the condensed phase polymers of this invention. Thus, the polymerization is carried out in an inert atmosphere in the absence of moisture, air, or other impurities which are known to react with polymer anions. A temperature between 0° C. and 100° C., more preferably between 30° C. and 80° C., is maintained. Suitable solvents are hydrocarbon solvents which may be aliphatic, cycloaliphatic, or aromatic. Optionally, ethers such as tetrahydrofuran, diethylether, or other similar solvents, may be used either alone or as mixtures with the hydrocarbon solvent.

If so desired, linking agents may be used to increase the degree of branching of the condensed phase copolymers or block copolymers beyond that achieved via the condensing agent. In this way, symmetrical polymer architectures such as radial or star structures, etc., can be created, the final structure being a function of the linking molecule. Such multifunctional linking agents are well-known in the art and are detailed, e.g., in U.S. Pat. No. 3,985,830. Preferred examples of such compounds are 1,2-dibromoethane, silicon tetrachloride, dichlorodimethyl silane, phenyl benzoate, and divinylbenzene. The quantity of linking agent used to further combine the anionically-terminated species of this invention is derived from the actual content of active polymer chain ends in the polymerization mixture. Generally, a mole equivalent of linking agent to chain ends is required when the agent links polymer chain ends by termination reactions, as is the case for, e.g., dibromoethane and silicon tetrachloride. When non-terminating agents such as divinylbenzene are utilized to form star polymers, higher mole ratios are used, generally within the range of from about 3:1 to about 20:1 or higher. The preferred range is from about 3:1 to about 8:1.

The molecular weights of the condensed phase polymers may be varied to suit an individual application. When conjugated diene monomers are utilized, preferred molecular weights are generally in the range of from about 50,000 to about 200,000. In the case of additional linking of these copolymers via, e.g., divinylbenzene to form star polymers, molecular weights may exceed 1,000,000. Condensed phase block copolymers can have individual segment molecular weights that are typically preferred in the art, i.e., from about 5,000 to about 50,000 for the glassy or hard monoalkenyl aromatic phase and from about 50,000 to about 250,000 for the elastomeric or rubbery conjugated diene phase.

Both the conjugated diene-based condensed phase copolymers and the condensed phase block copolymers (and linked structures derived from each) are useful in preparing pressure sensitive adhesive (PSA) compositions. The block copolymers utilized for this purpose typically have a hard phase content of from about 10% to about 30% by weight (the remainder constituting the rubbery phase). The PSA compositions may be formed by mixing condensed phase copolymer or block copolymer and tackifying resin, either in solution, as dry granules, or by melt blending. Any of the resinous (or synthetic) materials commonly used in the art to impart or enhance the tack of PSA compositions may be used as a tackifier. Examples include rosin, rosin esters of glycerol or pentaerythritol, hydrogenated rosins, polyterpene resins such as polymerized β-pinene, coumaroneindene resins, "C5" and "C9" polymerized petroleum fractions, and the like. The use of such tack-modifiers is common in the art, as is described in the *Handbook of Pressure-Sensitive Adhesive Technology* edited by Donatas Satas (1982). Tackifying resin is added in an amount sufficient to provide a tacky composition. This is typically achieved by adding from about 50 parts to about 300 parts by weight of tackifying resin per 100 parts by weight of condensed phase copolymer.

The tackifier resin is selected to provide the copolymers of the invention with an adequate degree of tack to maintain in the resultant composition balanced PSA properties including high shear and peel. As is known in the art, not all tackifier resins interact with the same base elastomer in the same manner; therefore some minor amount of experimentation may be required to select the appropriate tackifier resin and to achieve optimum adhesive performance. Such minor experimentation is well within the capability of one skilled in the adhesive art. Along these lines, selection of the resin should take into account whether the resin associates with the thermoplastic styrene segment or the rubbery segments.

It is also within the scope of this invention to include various other components in the adhesive formulation. For example, it may be desirable to include such materials as plasticizers, pigments, fillers, stabilizers, and/or various polymeric additives.

The PSA compositions can be applied as solutions, dispersions, or as hot melt coatings to suitable flexible or inflexible backing materials to produce PSA-coated sheet materials. Flexible backings may be of any material which is conventionally utilized as a tape backing or may be of any other flexible material. Representative examples of flexible tape backing materials include paper, plastic films such as poly(propylene), poly(ethylene), poly(vinyl chloride), polyester [e.g., poly(ethylene terephthalate)], cellulose acetate, and ethyl cellulose. Backings may also be of woven fabric formed of threads of synthetic or natural materials such as cotton, nylon, rayon, glass, or ceramic material, or they may be of a nonwoven fabric such as air-laid webs of natural or synthetic fibers or blends of these. In addition, the backing may be formed of metal, metallized polymeric film, or ceramic sheet material. The PSA-coated sheet materials may take the form of any article conventionally known to be utilized with PSA compositions such as labels, tapes, signs, covers, marking indices, and the like.

The PSA compositions may be coated by any of a variety of conventional coating techniques such as roll coating, knife coating, or curtain coating. The PSA compositions may also be coated without modification by extrusion, coextrusion, or hot melt techniques by employing suitable conventional coating devices for this purpose. Because of the unique rheological characteristics of the condensed phase polymers and their blends with tackifiers, hot melt coating is particularly preferred. Primers may be utilized, but they are not always necessary.

EXAMPLES

The invention is illustrated by the following examples, wherein all parts are by weight unless otherwise indicated.

Nomenclature and Symbols

"$S_{10M}$" is a short-hand designation for a polymer segment consisting of polystyrene(S) having a molecular weight of 10,000 (10 M). Other polymer segments are identified in a similar manner with the first letter representing the first letter of the monomer of the polymer segment and the subscript indicating the molecular weight in thousands, e.g., 10 M would mean a 10,000 molecular weight. As a further example, $I_{120M}$ represents a polymer segment based upon isoprene which has a molecular weight of 120,000.

"br/n" refers to the fact that the polymer is randomly branched, indicated by "br", and "n" is an integer expressing the functionality of the condensing agent monomer. The term "br/n" is used as a prefix for the polymer segment modified. For example, $S_{10M}\text{-br/2--}I_{120M}$ represents a block copolymer having a linear 10,000 molecular weight polystyrene segment ($S_{10M}$) and a randomly branched 120,000 molecular weight polyisoprene segment (br/2–$I_{120M}$).

Gel Permeation Chromatography

A Hewlett-Packard Model 1084B high performance liquid chromatograph equipped with two bimodal Zorbax PSM Kits (two columns at 60-S Å and two columns at 1000-S Å) was used for all determinations. Samples were dissolved in THF (AR grade) and filtered through a 0.5 micrometer polytetrafluoroethylene filter. Samples were injected at volumes of 10 microliters and eluted at a rate of 0.5 ml per minute through the columns maintained at 40° C. THF (AR grade) was used as the solvent. The differential refractometer detector was a Hewlett-Packard Model 1037A. The system was calibrated using polystyrene standards and employing a linear least squares fit. All GPC calculations were performed on an IBM 9000 integrator and all molecular weight averages are polystyrene equivalent molecular weights. The molecular weight averages were calculated according to accepted practices. GPC test methods are further explained in *Modern Size Exclusion Liquid Chromatography* by W. W. Yau, J. J. Kirkland, and D. D. Bly, John Wiley and Sons, 1979.

PSA Test Methods

The test methods which were used to evaluate PSA-coated flexible sheet materials are industry standard tests. The standard tests are described in various publications of the American Society for Testing and Materials (ASTM), Philadelphia, Pennsylvania, and the Pressure Sensitive Tape Council (PSTC), Glenview, Illinois, and are detailed below. The reference source of each of the standard test methods is also given.

Shear Adhesion

Reference: ASTM: D3654-78; PSTC-7

The shear adhesion strength is a measure of the cohesiveness or internal strength of an adhesive. It is based upon the amount of force required to pull an adhesive strip from a standard flat surface in a direction parallel to the surface to which it has been affixed with a definite pressure. It is measured in terms of time (in minutes) required to pull a standard area of adhesive coated sheet material from a stainless steel test panel under stress of a constant, standard load.

The tests were conducted on adhesive-coated strips applied to a stainless steel panel such that a 12.7 mm by 12.7 mm portion of each strip was in firm contact with the panel with one end portion of the tape being free. The panel with coated strip attached was held in a rack such that the panel forms an angle of 178° with the extended tape free end which is then tensioned by application of a force of one kilogram applied as a hanging weight from the free end of the coated strip. The 2° less than 180° is used to negate any peel forces, thus insuring that only the shear forces are measured, in an attempt to more accurately determine the holding power of the tape being tested. The time elapsed for each tape example to separate from the test panel is recorded as the shear adhesion strength.

Peel Adhesion

Reference: ASTM D3330-78 PSTC-1 (11/75)

Peel adhesion is the force required to remove a coated flexible sheet material from a test panel measured at a specific angle and rate of removal. In the examples, this force is expressed in Newtons per 100 mm (N/100 mm) width of coated sheet. The procedure followed is:

1. A 12.7 mm width of the coated sheet is applied to the horizontal surface of a clean glass test plate with at least 12.7 lineal cm in firm contact. A 2 kg hard rubber roller is used to apply the strip.
2. The free end of the coated strip is doubled back nearly touching itself so the angle of removal will be 180°. The free end is attached to the adhesion tester scale.
3. The glass test plate is clamped in the jaws of a tensile testing machine which is capable of moving the plate away from the scale at a constant rate of 2.3 meters per minute.
4. The scale reading in Newtons is recorded as the tape is peeled from the glass surface. The data is reported as the average of the range of numbers observed during the test.

EXAMPLES 1-23

The type and amount of each material used in each reaction, as well as the resultant polymer composition, are shown in Tables I-III for Examples 1-23.

A 5-liter, 5-necked reaction flask equipped with stirrer, condenser (under a small positive argon pressure from a gas bubbler), thermometer, and 3-septum inlet was used in the procedures which follow. All glassware and fittings were baked at 120+° C. for a minimum of 24 hours, were assembled under argon while hot, and then the entire apparatus was flamed under argon purge. Transfers of solvent and isoprene were made through stainless steel needles (through rubber septa) connected with polytetrafluoroethylene (Teflon®) tubing from a tared vessel or container using argon pressure. Styrene monomer was transferred through a rubber septum via syringe. Cyclohexane (AR grade) was dried by storage for 96+ hours over indicating 4-6 mesh silica gel, and styrene monomer was dried by chromatography on a 1 cm×15 cm two-layered alumina (150 mesh)/silica gel (28-200 mesh) column. Purification of isoprene was initiated by stirring with KOH pellets for a minimum of two hours, followed by removal of the KOH by filtration. The isoprene was then refluxed over $CaH_2$ granules and, finally, was distilled and collected under argon in 500 g portions which were stored at 0°-5° C. Divinylbenzene (Matheson, Coleman, and Bell (MCB), 56% commercial grade) was purified by chromatography on a chilled, two-layered alumina (150 mesh)/silica gel (28-200 mesh) column (approximately 1 cm×15 cm) immediately before use. sec-Butyl lithium (Lithium Corporation of America, 12% in cyclohexane) was used as received from freshly opened bottles and was transferred via syringe through a rubber septum. Alkoxy- or haloalkylsilylstyrene condensing agents were prepared under nitrogen by the method described in the Detailed Description above, were distilled and sealed (in glass ampoules) under vacuum, and were then refrigerated at 0°-5° C.

In each example described below, the following preliminary glassware "sweetening" process was carried out prior to polymerization: 0.3 ml styrene was added to cyclohexane (an amount equal to the tabulated amount of cyclohexane minus the amount required to additionally prepare a 50% solution of the tabulated amount of isoprene), the mixture was then heated to 55°-60° C., and 3.0 ml of 1.3 M sec-butyl lithium were added to obtain a bright orange color. Th solution was then kept under reflux for about 45 minutes, cooled to 60° C., and back-titrated with cyclohexane saturated with methanol until the color just disappeared.

EXAMPLES 1 AND 2

These examples demonstrate the preparation of polymers having random branching in the vinyl aromatic phase. Table I details reactant amounts and product compositions for polymers made via the following general procedure.

Tables I–III display quantities of styrene and isoprene in grams, with amounts of initiator and condensing agent in millimoles. Although this appears to be inconsistent, it is done to show the relationship among reactant amounts, amount of initiator or condensing agent, and molecular weight.

size exclusion gel permeation chromatography as described above) to be as shown in Table I.

TABLE I

RANDOMLY-BRANCHED STYRENE

| Ex. No. | Polymer | kg cyclohexane | mmol BuLi | g styrene | g isoprene | Condensing agent* Type | mmol | Linking agent** Type | mmol | MW of[1] AB × $10^{-3}$ | MW of Product × $10^{-3}$ | No. of Arms[2] per Star |
|---|---|---|---|---|---|---|---|---|---|---|---|---|
| 1 | (br/2-$S_{10M}$-1,4-$I_{60M}$)$_n$DVB | 1.4 | 4.29 | 21.4 | 128.6 | SSCL | 2.14 | DVB | 12.8 | 101 | 853 | 8 |
| 2 | (br/2-$S_{10M}$-1,4-$I_{60M}$)$_n$DVB | 1.9 | 5.80 | 28.5 | 171.5 | m-SSCL | 2.90 | DVB | 17.4 | 126 | 918 | 7 |

*SSCL = 4-(chlorodimethylsilyl)styrene
m-SSCL = 3-(chlorodimethylsilyl)styrene
**DVB = divinylbenzene
[1]Weight average molecular weight: polystyrene equivalent as determined by size exclusion gel permeation chromatography.
[2]Ratio of MW (product) to MW (AB)

After the glassware "sweetening" process (while still at 60° C.), the full charge of styrene (as indicated in Table I) was added and titrated with 1.3 M sec-butyl lithium to a pale yellow color. Then the full sec-butyl lithium initiator charge (as indicated in Table I) was added. Exactly one minute after the sec-butyl lithium addition, neat chloroalkylsilylstyrene condensing agent was added by injection through a rubber septum, and the reaction mixture was then stirred and kept at 60° C., for one hours. The reaction was continued by adding a 50% solution of isoprene (quantity shown in Table I) in cyclohexane which had been passed through a 4 cm×20 cm column of 28–200 mesh silica gel (minimum residence time of 30 minutes). The reaction mixture was then allowed to polymerize for three hours at 60°–65° C. During the initial exotherm, a cold water bath was necessary to prevent excessive reflux and loss of isoprene. Finally, star block copolymer was formed by adding divinylbenzene linking agent in one portion via syringe (through a rubber septum) and allowing polymerization over several hours at 60°–65° C. before termination with 1 ml of degassed methanol. The reaction flask was then allowed to cool to room temperature, was opened, and 3.5% by weight of solids of octadecyl-3,5-di-tert-butyl-4-hydroxyhydrocinnamate antioxidant and thermal stabilizer (Ciba Geigy Irganox® 1076) was immediately added as a polymer stabilizer. Next, precipitation of the polymer was achieved by slow addition of the polymer syrup to agitate isopropanol, followed by air drying or drying in a vacuum oven at 40° C. The yield was essentially quantitative, and weight average molecular weights were determined (by

EXAMPLES 3–14

These examples demonstrate the preparation of polymers having random branching in the rubbery diene phase. Table II details reactant amounts and product compositions for polymers made via the following general procedure.

After the glassware "sweetening" process, the full charge of styrene (as indicated in Table II) was added, followed by the initiating dose of sec-butyl lithium. The temperature was maintained at 60° C. for one hour. The alkoxy- or haloalkylsilylstyrene condensing agent was then added to a 50% solution of isoprene (or, for example 12, butadiene) in cyclohexane which had previously been passed through a column of silica gel as described above. This solution was added to the reaction flask (by argon pressure) through two stainless steel needles (through rubber septa) connected with polytetrafluoroethylene (Teflon®) tubing. The reaction temperature was maintained at 55°–60° C. at first by cooling and later by heating for three hours.

At this point, the reaction was terminated for examples 3, 4 and 10–14. Example 5 required the sequential addition of another charge of styrene (13 g) and maintaining the temperature at 55°–60° C. for another hour before termination. Star block copolymer was formed in Examples 6–9 by addition of divinylbenzene that had been purified as described previously. The temperature was then kept at 60° C. for several hours before termination. In all cases, the polymerization was terminated by the addition of 1 ml of degassed methanol followed by cooling, stabilization (by addition of 3.5% by weight of solids of Irganox® 1076), precipitation in isopropanol, and drying, as described above. Molecular weights were determined to be as shown in Table II.

TABLE II

RANDOMLY-BRANCHED ISOPRENE

| Ex. No. | Polymer | kg cyclohexane | mmol BuLi | g styrene | g isoprene | Condensing agent* Type | mmol | Linking agent** Type | mmol | MW of[1] AB × $10^{-3}$ | MW of[1] Product × $10^{-3}$ | No. of Arms[2] per Star |
|---|---|---|---|---|---|---|---|---|---|---|---|---|
| 3 | ($S_{10M}$-br/2-1,4-$I_{120M}$) | 1.7 | 4.29 | 42.9 | 257 | SSCL | 2.14 | . | . | . | 137 | . |
| 4 | ($S_{10M}$-br/3-1,4-$I_{184M}$) | 2.3 | 4.20 | 42 | 258 | SSDCL | 1.40 | . | . | . | 480 | . |
| 5 | ($S_{10M}$-br/3-1,4-$I_{278M}$-$S_{10M}$) | 2.29 | 2.60 | 26 | 241 | SSDCL | 0.87 | . | . | . | 589 | . |
| 6 | ($S_{10M}$-br/2-1,4-$I_{120M}$)$_n$DVB | 1.5 | 3.91 | 39 | 234 | SSCL | 1.96 | DVB | 11.8 | 176 | 915 | 5 |
| 7 | ($S_{10M}$-br/3-1,4-$I_{184M}$)$_n$DVB | 2.0 | 4.20 | 42 | 258 | SSDCL | 1.40 | DVB | 8.4 | 176 | 1,114 | 6 |
| 8 | ($S_{5M}$-br/3-1,4-$I_{184M}$)$_n$DVB | 2.6 | 4.20 | 21 | 258 | SSDCL | 1.40 | DVB | 8.4 | 155 | 1,063 | 7 |

TABLE II-continued

RANDOMLY-BRANCHED ISOPRENE

| Ex. No. | Polymer | kg cyclo-hexane | mmol BuLi | g styrene | g iso-prene | Condensing agent* Type | mmol | Linking agent** Type | mmol | MW of[1] AB × 10⁻³ | MW of[1] Product × 10⁻³ | No. of Arms[2] per Star |
|---|---|---|---|---|---|---|---|---|---|---|---|---|
| 9 | (S₆₂₄-br/3-1.4-I₁₅₀ₘ)ₙDVB | 2.3 | 5.40 | 3.37 | 280 | SSDCL | 1.80 | DVB | 18 | 132 | 1,142 | 9 |
| 10 | S₁₀ₘ-br/2-1.4-I₁₂₀ₘ | 2.0 | 3.33 | 33.3 | 200 | SSMO | 1.67 | . | . | . | Tri-modal | . |
| 11 | S₁₀ₘ-br/2-1.4-I₁₂₀ₘ | 2.0 | 3.33 | 33.3 | 200 | SSF | 1.67 | . | . | . | 212 | . |
| 12 | S₁₀ₘ-br/2-1.4-Bd₁₂₀ₘ | 2.9 | 3.57 | 35.7 | 214.3[3] | SSCL | 1.79 | . | . | . | 260 | . |
| 13 | S₁₀ₘ-br/4-1.4-I₂₄₀ₘ | 2.1 | 3.33 | 33.3 | 200 | SSTCL | 0.833 | . | . | . | 570 | . |
| 14 | (S₁₀ₘ-br/2-1.4-I₁₂₀ₘ) | 2.2 | 4.15 | 41.5 | 249 | SSBr | 2.07 | . | . | . | 149 | . |

*SSCL = 4-(chlorodimethylsilyl)styrene
SSDCL = 4-(dichloromethylsilyl)styrene
SSBr = 4-(bromodimethylsilyl)styrene
SSF = 4-(fluorodimethylsilyl)styrene
SSTCL = 4-(trichlorosilyl)styrene
SSMO = 4-(methoxydimethylsilyl)styrene
**DVB = divinylbenzene
[1]Weight average molecular weight: polystyrene equivalent as determined by size exclusion gel permeation chromatography
[2]Ratio of MW (product) to MW (AB)
[3]Butadiene was employed in place of isoprene

EXAMPLES 15-23

These examples demonstrate the preparation of polymers having point-branched structures. Table III details reactant amounts and product compositions for polymers made via the following general procedure.

After the glassware "sweetening" process, the full styrene charge (see Table III) was added, followed by the sec-butyl lithium initiating charge. A temperature of 55°-60° C. was held for one hour.*

*For Examples 16-23, the chloroalkylsilylstyrene condensing agent was injected at this point (in one portion by syringe), and the temperature was maintained at 55°-60° C. for another 45 minutes. Then a purified 50% solution of isoprene in cyclohexane was added as described above, and the reaction temperature was kept at 55°-60° C. for three hours, at first by cooling and later by heating. Finally, the divinylbenzene (or other) linking agent (as shown in Table III) was added and a temperature of 60° C. maintained for several hours.

*For Example 15, ¼ of a purified 50% solution of isoprene in cyclohexane was added at this point, and the temperature was held at 55°-60° C. for 2 hours and 45 minutes. Then, the haloalkylsilylstyrene condensing agent was added and the same temperature range maintained for another 45 minutes, at which time the remaining ¼ of the isoprene solution was added and the temperature again held at 55°-60° C. for 2 hours and 45 minutes. Lastly, the divinylbenzene linking agent was added and a temperature of 60° C. maintained for several hours.

For all of these examples (15-23), termination was achieved via addition of 1 ml of degassed methanol, and, after cooling to room temperature, the polymer was stabilized, precipitated, and dried as described for the previous examples. Molecular weights were as shown in Table III.

TABLE III

POINT BRANCHING

| Ex. No. | Polymer | kg cyclo-hexane | mmol BuLi | g styrene | g iso-prene | Condensing agent* Type | mmol | Linking agent** Type | mmol | MW of[1] AB × 10⁻³ | MW of[1] Product × 10⁻³ | No. of Arms[2] per Star |
|---|---|---|---|---|---|---|---|---|---|---|---|---|
| 15 | [(S₁₀ₘ-1.4-I₃₈ₘ)₃-1.4-I₃₈ₘ]ₙDVB | 2.3 | 6.00 | 60 | 300 | SSDCL | 2.00 | DVB | 12 | 517 | 1,384 | 3 |
| 16 | [(S₅ₘ)₂-1.4-I₆₀ₘ]ₙDVB | 1.9 | 8.00 | 40 | 240 | SSCL | 4.00 | DVB | 24 | 117 | 857 | 7 |
| 17 | [(S₅ₘ)₃-1.4-I₁₀₇ₘ]ₙDVB | 2.3 | 8.61 | 43 | 307 | SSDCL | 2.87 | DVB | 17.2 | 239 | 1,261 | 5 |
| 18 | [(S₁₀ₘ)₂-1.4-I₁₂₀ₘ]ₙDVB | 2.3 | 4.00 | 40 | 240 | αMSSCL | 2.00 | DVB | 12 | 195 | 1,226 | 6 |
| 19 | [(S₁₀ₘ)₂-1.4-I₁₂₀ₘ]ₙDVB | 2.3 | 6.20 | 53 | 372 | mSSCL | 3.10 | DVB | 27.9 | 277 | 1,553 | 6 |
| 20 | [(S₁₀ₘ)₂-1.4-I₆₀ₘ]₂DEPO | 2.0 | 6.20 | 62 | 186 | mSSCL | 3.10 | DEPO | 0.221 | 209 | 436 | 2 |
| 21 | [(S₁₀ₘ)₂-1.4-I₆₀ₘ]₂PB | 2.0 | 5.20 | 52 | 156 | mSSCL | 2.60 | PB | 1.30 | 142 | 307 | 2 |
| 22 | [(S₁₀ₘ)₂-1.4-I₆₀ₘ]₂DBE | 1.4 | 3.75 | 37.5 | 112.5 | SSBr | 1.875 | DBE | 0.94 | 138 | 322 | 2 |
| 23 | [(S₁₀ₘ)₄-1.4-I₂₄₀ₘ] | 2.2 | 3.33 | 33.3 | 200 | SSTCL | 0.83 | — | — | 570 | 570 | — |

*SSCL = 4-(chlorodimethylsilyl)styrene
SSDCL = 4-(dichloromethylsilyl)styrene
αMSSCL = 4-(chlorodimethylsilyl)-α-methylstyrene
mSSCL = 3-(chlorodimethylsilyl)styrene
SSBr = 4-(bromodimethylsilyl)styrene
SSTCL = 4-(trichlorosilyl)styrene
**DEPO = 1,2,7,8-diepoxyoctane
PB = phenylbenzoate
DVB = divinylbenzene
DBE = 1,2-dibromoethane
[1]Weight average molecular weight: polystyrene equivalent as determined by size exclusion gel permeation chromatography
[2]Ratio of MW (product) to MW (AB)

EXAMPLE 24

This example demonstrates the preparation of block copolymer which is randomly-branched in both the vinyl aromatic and diene phases:

br/2−S₂₀ₘ−br/2−1,4−I₁₂₀ₘ

Following the procedure for Example 1, a randomly-branched styrene polymer was produced from 2.0 kg cyclohexane, 6.0 mmol sec-butyl lithium, 60.0 g styrene, and 3.0 mmol 4-(chlorodimethylsilyl)styrene condensing agent. To the living polymeric anion obtained in this step was added (following the procedure set forth in Example 3) a 50% solution of 180.0 g isoprene in cyclohexane, to which 1.5 mmol 4-(chlorodimethylsilyl)styrene had been added. After stirring for 3 hours at 55°–60° C., the polymerization was terminated and the polymer cooled, stabilized, and collected as described above. The weight average molecular weight of the product was 290,000, with a dispersity of 1.16 (styrene equivalents).

EXAMPLE 25

Figure 2:
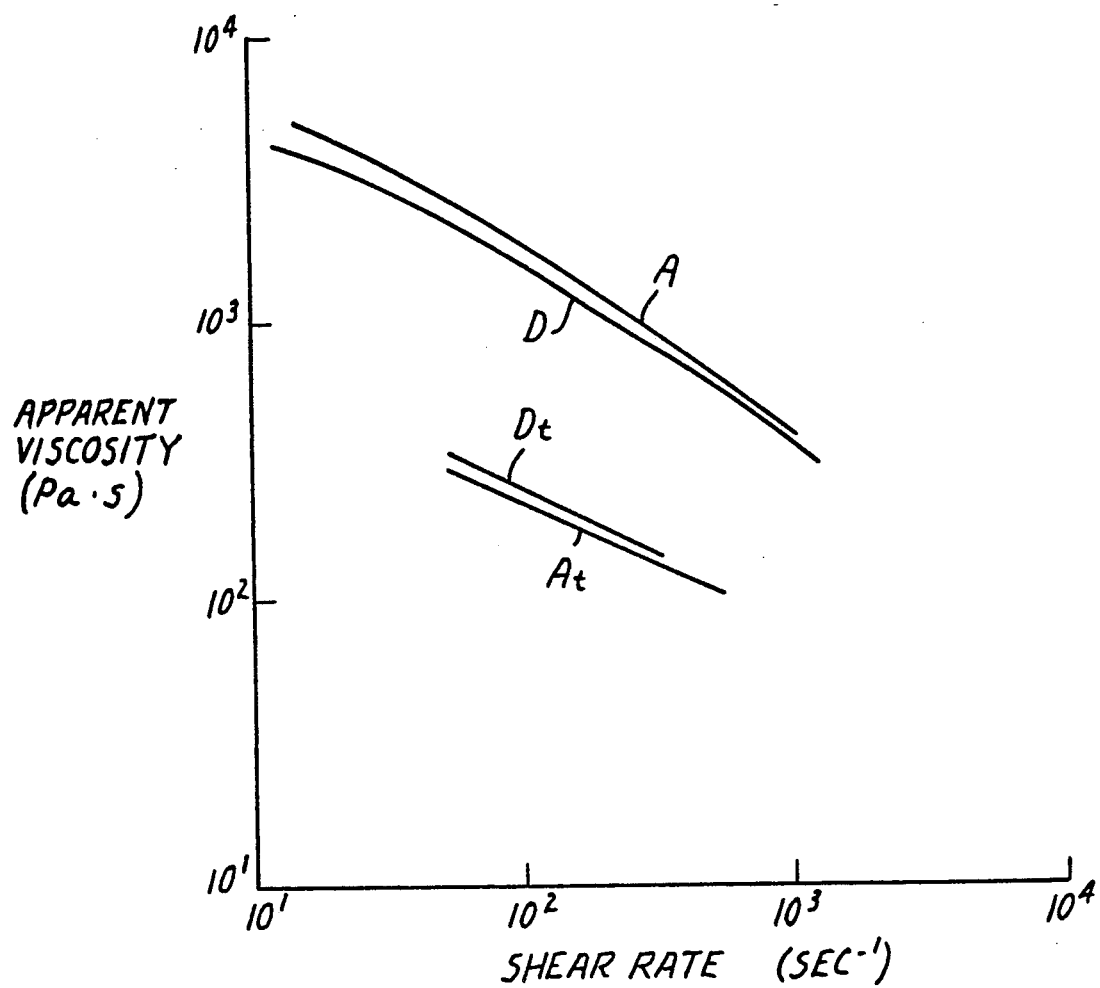

This example compares the melt viscosity characteristics of condensed phase block copolymers over a broad range of shear rates with state-of-the-art linear triblock polymer, Kraton ® 1107 (Shell Oil Co.), MW=75,000 (based on a 3M determination). Three different types of condensed phase block polymer are compared. The data are shown in FIG. 1. The melt viscosity was determined using a Siegloff-McKelvey capillary viscometer at 170° C., L/D=51. The melt viscosity for the polymer of Example 3, shown as line B, which has incorporated a bifunctional condensing reagent, was found to be an order of magnitude lower than the linear control sample, Kraton ® 1107, shown as line D. The polymer of Example 4, which incorporates a trifunctional condensing reagent in the copolymerization of the isoprene segment, has a melt viscosity (shown as line C) only slightly higher than the control, even though the molecular weight of the condensed block polymer is about 2.5 times greater. When the condensing reagent is copolymerized in the vinylaromatic segment, a remarkable reduction in melt viscosity is observed. The data show that for the polymer of Example 1, shown as line A, the viscosity characteristics are substantially the same as for the control polymer, even though Example 1 is a condensed phase star block polymer with a molecular weight of about 853,000 (about five times the control). The effect persists when both polymers are tackified with 100 phr (parts per hundred rubber) Wingtack Plus ® (Goodyear Tire and Rubber Co.) and their melt viscosities compared, as shown in FIG. 2. ("At" refers to the viscosity data for the tackified polymer of Example 1 and "Dt" refers to tackified Kraton ® 1107 block copolymer control.) In addition to having a very low melt viscosity for its molecular weight, the "condensed" styrene phase star polymer also shows a low dependence of viscosity on shear rate.

EXAMPLE 26

This example illustrates the rheological effects of random branching in the rubbery or diene phase of block polymers.

Figure 3:
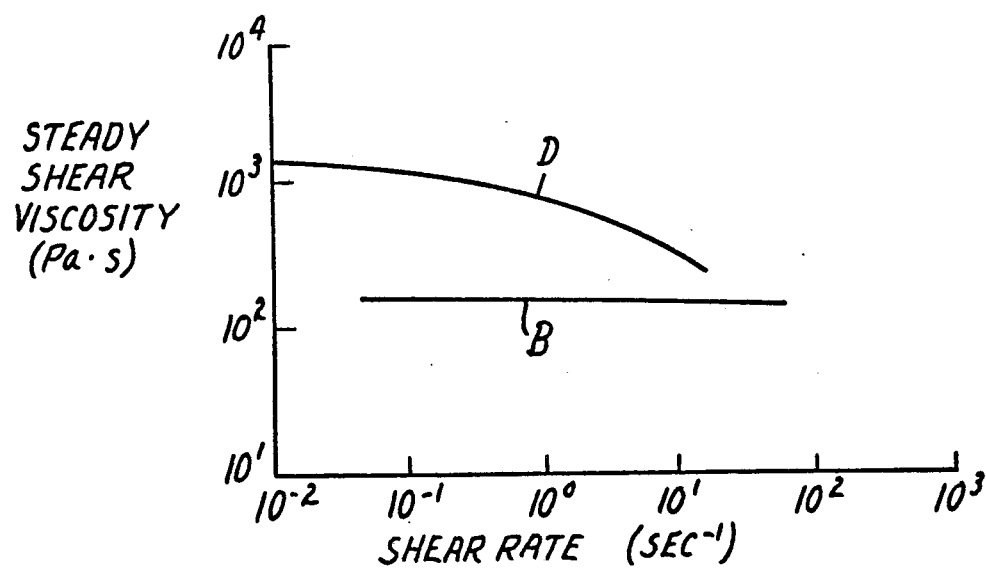
FIG. 3 is a graph depicting the steady shear viscosity of polymer according to the invention and a styrene isoprene linear triblock copolymer (Shell's Kraton ® 1107) according to the prior art as a function of shear rate.

Condensing together growing diene polymer chains in a more or less random fashion during an anionic polymerization leads to polymers with unusual rheological properties when compared to conventional, linear materials. Comparison of a linear triblock polymer, Kraton ® 1107 (Shell Chemical Company), with a condensed diene phase styrene-isoprene block polymer, $S_{10M}$-br/2-$I_{120M}$ (Example 3), using steady shear viscosity measurements performed at 190° C. on a Rheometrics Mechanical Spectrometer showed that, for the experimental condensed block polymer, the steady shear viscosity has a relatively low value of $10^2$Pa·s which is shear rate-independent over the range shown in FIG. 3. (In FIG. 3, "D" refers to the Kraton ® 1107 block copolymer control and "B" refers to the polymer of Example 3.) This effect would be an advantage in hot melt coatings, since better control and uniformity could be achieved due to the Newtonian-like behavior of the polymer.

EXAMPLES 27 AND 28

This example demonstrates the properties of pressure-sensitive adhesive compositions derived from point-branched and randomly-branched block polymers.

The novel polymers of this invention were formulated into pressure-sensitive adhesives (PSAs) by solution blending in toluene the branched or "condensed phase" block polymer, a synthetic hydrocarbon tackifier resin, and 3 phr (parts per hundred rubber) Irganox ® 1076 stabilizer. These adhesive compositions were knife-coated at a thickness of 25 micrometers onto primed 38-micrometer polyethylene terephthalate film, were dried for 5 minutes at 60° C., and were then conditioned for 24 hours at 21° C. and 50% relative humidity. Tape testing was carried out according to the test methods previously described, and the results are detailed in Tables IV and V below. In addition, Table V ("Randomly-Branhed Block Polymer PSAs") includes data for analogous linear (unbranched) diblock polymer PSA compositions as comparative examples. The data shows that a significant improvement in PSA properties is observed when a "condensing" reagent is copolymerized to form a branched or "condensed" polymer structure.

EXAMPLE 27

TABLE IV

| Point-Branched Block Polymer PSAs | | | | |
|---|---|---|---|---|
| Polymer (Previous Ex. No.) | Tackifier Tradename (phr) | | Peel (N/100 mm) | Shear[2] (RT, Min.) |
| 15 | Wingtack Plus ®[1] | 80 | 107 | 5,000+ |
|  |  | 100 | 120 | 5,000+ |
|  |  | 120 | 131 | 5,000+ |
| 17 | Wingtack Plus ® | 80 | 107 | 4,503 |
|  |  | 100 | 116 | 10,000+ |
|  |  | 120 | 129 | 10,000+ |
| 18 | Wingtack Plus ® | 80 | 99 | 5,000+ |
|  |  | 100 | 123 | 5,000+ |
|  |  | 120 | 136 | 5,000+ |

[1]Available from Goodyear Tire & Rubber Company
[2]+indicates that test was terminated at this point.

EXAMPLE 28

Excellent shear and peel adhesion characteristics are also obtained with randomly-branched block polymers when formulated into PSAs, as shown below.

TABLE V

| Randomly-Branched Block Polymer PSAs | | | | |
|---|---|---|---|---|
| Polymer (Previous Ex. No.) | Tackifier Tradename (phr) | | Peel (N/100 mm) | Shear[3] (RT, Min.) |
| 1 | Wingtack Plus ®[1] | 80 | 99 | 7,100+ |
|  |  | 100 | 127 | 7,100+ |
|  |  | 120 | 151 | 7,100+ |
|  | Escorez ® 5300[2] | 80 | 109 | 7,100+ |
|  |  | 100 | 134 | 7,100+ |
|  |  | 120 | 151 | 7,100+ |

TABLE V-continued

Randomly-Branched Block Polymer PSAs

| Polymer (Previous Ex. No.) | Tackifier Tradename (phr) | | Peel (N/100 mm) | Shear[3] (RT, Min.) |
|---|---|---|---|---|
| 3 | Wingtack Plus ® | 80 | 103 | 3,792 |
| | | 100 | 142 | 4,000+ |
| | | 120 | 166 | 3,847 |
| | Escorez ® 5300 | 80 | 109 | 4,100+ |
| | | 100 | 120 | 4,100+ |
| | | 120 | 74 | 4,100+ |
| 4 | Wingtack Plus ® | 80 | 120 | 10,000+ |
| | | 100 | 116 | 10,000+ |
| | | 120 | 120 | 10,000+ |
| 5 | Wingtack Plus ® | 80 | 88 | 5,000+ |
| | | 100 | 99 | 5,000+ |
| | | 120 | 114 | 5,000+ |
| 6 | Wingtack Plus ® | 80 | 99 | 6,000+ |
| | | 100 | 118 | 6,000+ |
| | | 120 | 112 | 6,000+ |
| | Escorez ® 5300 | 80 | 107 | 6,000+ |
| | | 100 | 118 | 6,000+ |
| | | 120 | 120 | 6,000+ |
| 7 | Wingtack Plus ® | 80 | 63 | 7,500+ |
| | | 100 | 96 | 7,500+ |
| | | 120 | 147 | 7,500+ |
| 8 | Wingtack Plus ® | 80 | 125 | 2,594 |
| | | 100 | 151 | 1,498 |
| | | 120 | 199 (coh)[4] | 753 |
| $S_{10M}$-$I_{60M}$ | Wingtack Plus ® | 100 | 127 | 3 |
| $S_{10M}$-$I_{180M}$ | Wingtack Plus ® | 100 | 116 | 8 |

[1]Available from Goodyear Tire and Rubber Company
[2]Available from Exxon Chemical Company
[3]+ indicates that test was terminated at this point
[4](coh) indicates cohesive failure

EXAMPLE 29

Pressure-sensitive adhesives formulated as in Example 28 have improved high temperature shear performance compared to their linear counterparts. As shown in Table VI, shear adhesion dramatically improves as the condensing reagent is copolymerized in the isoprene phase. There is also a significant improvement in shear adhesion when the polymers are further linked with divinylbenzene to form a condensed phase star polymer.

TABLE VI

| | | Shear Adhesion at 66° C. For PSA Formulations[2] | | | Melt Viscosity (Pa · s × $10^{-2}$) | |
|---|---|---|---|---|---|---|
| | | Time to failure[1] at load (minutes at 66° C.) | | | (at 100 sec$^{-1}$ shear rate) | |
| Polymer Structure | Ex. | 200 g | 500 g | 1000 g | 170° C. | 190° C. |
| $S_{10M}$-$I_{120M}$ | — | 2 | <1 | <1 | 2.35 | 0.98 |
| $S_{10M}$-br/2-$I_{120M}$ | 3 | 1184 | 20 | 3 | | 1.8 |
| $(S_{10M}$-$I_{120M})$DVB | — | >10,000 | 1478 | 59 | 7.7 | 6.5 |
| $(S_{10M}$-br/2-$I_{120M})$DVB | 6 | >10,000 | 4080 | 350 | 4.2 | 2.0 |
| $S_{10M}$-$I_{180M}$ | — | 1712 | 13 | <1 | 2.85 | |
| $S_{10M}$-br/3-$I_{184M}$ | 4 | 3267 | 545 | 108 | 3.2 | 2.5 |
| $S_{11.5M}$-$I_{145M}$-$S_{11.5M}$ | Control[3] | 2068 | 279 | 48 | 2.85 | 2.7 |

[1]Shear adhesion failure, 12.7 mm × 12.7 mm overlap, 25-micrometer coat thickness on polyethylene terephthalate, all failures were cohesive
[2]Tackified with 100 phr Wingtack Plus ®
[3]Commercially available Kraton ® 1107 block copolymer

EXAMPLE 30

This example illustrates the tensile properties of condensed-phase diblock polymers of the invention. Polymer films were prepared by casting solutions of the polymer in toluene (30% solids) onto polytetrafluoroethylene (Teflon ®) sheets or silicone release liners using glass cylinders as spacers. Solvent was allowed to evaporate over a period of 7 days. The sample was further dried in a vacuum oven at 40° C. for 48 hours. Stress-strain measurements were made using a modification of ASTM D 412 with a micro-dumbbell and 2 in./min. crosshead speed. An Instron Universal Testing Machine was used to measure the stress-strain properties of the samples. Elongation was estimated by measuring the distance between bench marks on the sample. The stress was recorded continuously on a chart recorder.

TABLE VII

Tensile Properties of Condensed-Phase Diblock Polymers

| Example Number | 300% Modulus (psi) | Tensile Modulus (psi) | Elongation (%) |
|---|---|---|---|
| 3 | 75 | 390 | 1100 |
| 10 | 131 | 335 | 1025 |
| 11 | 150 | 594 | 1250 |
| 24 | 200 | 1000 | 1200 |
| Kraton ® 1107* | 112 | 2724 | 1300 |

*Kraton ® 1107 is a linear styrene-isoprene triblock polymer from Shell Oil Company.

While this invention has been described in terms of specific embodiments, it should be understood that it is capable of further modifications. The claims herein are intended to cover those variations which one skilled in the art would recognize as the chemical equivalent of what has been described here.

We claim:

1. A copolymer comprising the product of the reaction of a multifunctional linking agent monomer and an anionically terminated elastomeric copolymer having a condensed phase structure wherein polymer branches occur along a polymer backbone, said elastomeric copolymer comprising the copolymerized reaction product of
   (a) hydrocarbyl lithium initiator;
   (b) at least one anionically polymerizable monomer;
   (c) a condensing agent monomer having the general formula $$CH_2 = C(R')QY(R)_n(X)_m$$

wherein

Y is tetravalent Si, Ge, Sn, or Pb;
   X is H, —OR″, Cl, Br or F, wherein R″ is a monovalent lower alkyl group having from 1 to 6 carbon atoms;
   R is hydrogen, a monovalent lower alkyl group having from 1 to 6 carbon atoms, or phenyl;
   Q is phenylene;

R' is hydrogen, a monovalent lower alkyl group having from 1 to 6 carbon atoms, or phenyl;

m is an integer of 1, 2 or 3; and n is an integer equal to 3-m wherein the mole ratio of (a) to (c) is about (1+m):1 and wherein the mole percentage of condensing agent in each copolymer segment containing said condensing agent is in the range of about 0.01% to about 5%.

2. The anionic copolymer of claim 1 wherein said multifunctional linking agent monomer is selected from the group consisting of divinylbenzene, dichlorodimethyl silane, phenyl benzoate, dibromoethane, and silicon tetrachloride.

3. The anionic copolymer of claim 1 wherein said condensing agent has the general formula $$CH_2=C(H)QSi(CH_3)_n(X)_m$$

where X is F, Cl, Br or methoxy.

4. An elastomeric copolymer represented by the formula $$(B/Z)_y L_z$$

where:

B/Z is an elastomeric copolymer of conjugated diene compound and a condensing reagent having the general formula $$CH_2=C(R')QY(R)_n(X)_m$$

where:

X is H, —OR'', Cl, Br or F wherein R'' is a monovalent lower alkyl group having from 1 to 6 carbon atoms;

R is hydrogen or a monovalent lower alkyl group having from 1 to 6 carbon atoms or a phenyl;

Y is tetravalent Si, Ge, Sn or Pb;

Q is phenylene;

R' is hydrogen, a monovalent lower alkyl group having from 1 to 6 carbon atoms or phenyl;

m is an integer of 1, 2 or 3; and n is an integer equal to 3-m;

L is the residue of a multifunctional linking agent;

y is an integer from 1 to about 50;

z is an integer from zero to about 10 and, when y is 1, z is zero; and wherein the mole percentage of Z in the segment B/Z is in the range of about 0.01% to about 1%.

5. The elastomeric copolymer of claim 4 wherein said multifunctional linking agent is selected from the group consisting of divinyl benzene, dichlorodimethyl silane, phenyl benzoate, dibromoethane and silicon tetrachloride.

6. The elastomeric copolymer of claim 4 wherein said elastomeric copolymer is based upon a conjugated diene compound selected from the group consisting of butadiene, isoprene, and piperylene.

7. The elastomeric copolymer of claim 4 wherein said mole percentage of Z in the segment B/Z is in the range of about 0.02% to about 0.2%.

* * * * *

UNITED STATES PATENT AND TRADEMARK OFFICE
CERTIFICATE OF CORRECTION

PATENT NO. : 5,115,034

DATED : May 19, 1992

INVENTOR(S) : SILVER, ET AL.

It is certified that error appears in the above-identified patent and that said Letters Patent is hereby corrected as shown below:

Col. 2, line 28      $X_{4-a-b}Si(R)_b(CH=CH_2)_1$ should read --$X_{4-a-b}Si(R)_b(CH=CH_2)_a$--.

Col. 3, line 28      "107,262" should read --107,292-- and "4,857,168" should read --4,857,618--.

Col. 4, line 45      "R,," should read --R',--.

Col. 12, line 67      "Th" should read --The--.

Col. 13, line 32      "hours." should read --hour.--.

Col. 13, line 51      "agitate" should read --agitated--.

Table I      In the table heading, "MW of Product X $10^{-3}$" should read --MW of Product X $10^{-3}$--.

Col. 17, line 21      "75,000" should read --175,000--.

Signed and Sealed this

Thirteenth Day of October, 1992

Attest:

DOUGLAS B. COMER

Attesting Officer      Acting Commissioner of Patents and Trademarks